US009592172B2

(12) United States Patent
Ferreri et al.

(10) Patent No.: US 9,592,172 B2
(45) Date of Patent: Mar. 14, 2017

(54) RETRACTABLE WHEEL BASE

(71) Applicant: United Metal Fabricators, Inc., Johnstown, PA (US)

(72) Inventors: Scott G Ferreri, Duncansville, PA (US); Joseph Romano, Johnstown, PA (US); Nathaniel Francis Barbera, Somerset, PA (US); Eric Richard Colburn, Wexford, PA (US)

(73) Assignee: United Metal Fabricators, Johnstown, PA (US)

( * ) Notice: Subject to any disclaimer, the term of this patent is extended or adjusted under 35 U.S.C. 154(b) by 0 days.

(21) Appl. No.: 14/823,327

(22) Filed: Aug. 11, 2015

(65) Prior Publication Data

US 2015/0351986 A1 Dec. 10, 2015

Related U.S. Application Data

(63) Continuation-in-part of application No. 14/289,209, filed on Jun. 6, 2014, now Pat. No. 9,132,053.

(51) Int. Cl.

*B62D 21/14* (2006.01)
*A61G 15/00* (2006.01)
*A61G 13/10* (2006.01)

(52) U.S. Cl.

CPC ......... *A61G 15/002* (2013.01); *A61G 13/104* (2013.01); *A61G 13/105* (2013.01)

(58) Field of Classification Search

CPC ... B62B 5/0086; B62B 5/0089; B62B 5/0083; B62B 33/04; B62B 33/045; B62B 33/06; B62B 33/063; B62B 33/066; B25H 1/04; A61G 7/08; A61G 2007/0528

See application file for complete search history.

(56) References Cited

U.S. PATENT DOCUMENTS

| | | | | |
|---|---|---|---|---|
| 2,042,489 | A | 6/1936 | Williams | |
| 2,655,387 | A | 10/1953 | Cramer | |
| 2,788,219 | A | 4/1957 | McClellan | |
| 2,794,694 | A | 6/1957 | Fullwood et al. | |
| 3,130,979 | A * | 4/1964 | Valiquette | B60B 33/06 280/30 |
| 3,179,438 | A * | 4/1965 | Field | B60B 33/06 280/43.14 |
| 3,806,092 | A | 4/1974 | Richards | |
| 3,845,933 | A | 11/1974 | Heizer | |
| 4,225,125 | A | 9/1980 | Lee | |

(Continued)

FOREIGN PATENT DOCUMENTS

EP 0366365 A2 5/1990

*Primary Examiner* — Hau Phan
*Assistant Examiner* — Jacob Meyer
(74) *Attorney, Agent, or Firm* — Metz Lewis Brodman Must O'Keefe LLC

(57) ABSTRACT

A base with retractable wheels is provided for an examination, procedure or surgical table or chair for use in the medical, dental, or veterinary fields that can be easily switched between a stationary state and a mobile state. The base includes fixed wheels on one end and on the other end stationary foot pads and retractable wheels that can be engaged by a lift mechanism that can transfer the weight of the table or chair from the foot pads onto the wheels, allowing the table or chair to be more easily moved within a room.

14 Claims, 5 Drawing Sheets

(56) References Cited

U.S. PATENT DOCUMENTS

| | | | | | |
|---|---|---|---|---|---|
| 4,309,791 | A * | 1/1982 | Aulik | A61G 1/04 | 16/35 R |
| 4,925,357 | A * | 5/1990 | Cisternino | B62B 5/0083 | 254/8 R |
| 5,347,682 | A * | 9/1994 | Edgerton, Jr. | A61G 7/012 | 16/32 |
| 5,377,372 | A * | 1/1995 | Rudolf | A61G 7/00 | 16/35 R |
| 5,615,451 | A * | 4/1997 | Peterson | B60B 33/06 | 16/34 |
| 5,628,522 | A | 5/1997 | Hall | | |
| 5,944,291 | A * | 8/1999 | Kato | A47B 13/00 | 16/19 |
| D415,868 | S * | 10/1999 | Hewitt | D34/23 | |
| 6,109,625 | A * | 8/2000 | Hewitt | B60B 33/0007 | 280/43.24 |
| 6,321,878 | B1 * | 11/2001 | Mobley | A61G 7/00 | 188/1.12 |
| 6,363,556 | B1 * | 4/2002 | Krauska | A61G 7/002 | 5/613 |
| 7,062,805 | B2 * | 6/2006 | Hopper | A61G 1/0237 | 280/47.16 |
| 7,077,406 | B2 | 7/2006 | Lin | | |
| 7,137,161 | B2 | 11/2006 | Hempker et al. | | |
| 7,480,948 | B2 * | 1/2009 | Reinke | A61G 1/0287 | 5/601 |
| 7,810,822 | B2 * | 10/2010 | Figel | A61G 1/04 | 188/29 |
| 8,016,300 | B2 | 9/2011 | Cramer et al. | | |
| 8,511,693 | B2 | 8/2013 | Gass | | |
| 8,657,243 | B2 | 2/2014 | Marugg | | |
| 8,657,306 | B2 * | 2/2014 | Chiu | B23Q 1/015 | 280/43.1 |
| 2004/0139545 | A1 * | 7/2004 | Reinke | A61G 1/0287 | 5/86.1 |
| 2005/0199430 | A1 * | 9/2005 | Vogel | A61G 7/00 | 180/15 |
| 2006/0103092 | A1 * | 5/2006 | Strahler | B62B 3/04 | 280/79.11 |
| 2008/0229545 | A1 * | 9/2008 | Duvert | A47D 7/00 | 16/35 R |
| 2009/0174162 | A1 * | 7/2009 | Gass | B25H 1/04 | 280/79.11 |
| 2011/0191959 | A1 * | 8/2011 | Hornbach | A47C 19/045 | 5/611 |
| 2013/0056610 | A1 * | 3/2013 | Gass | B25H 1/04 | 248/647 |
| 2014/0174254 | A1 * | 6/2014 | Ma | A45B 23/00 | 74/99 R |

* cited by examiner

RETRACTABLE WHEEL BASE

CROSS-REFERENCE TO RELATED APPLICATIONS

This application is a continuation of and claims the benefit of U.S. patent application Ser. No. 14/298,209 titled "Retractable Wheel Base" and filed on Jun. 6, 2014.

STATEMENT REGARDING FEDERALLY SPONSORED RESEARCH OR DEVELOPMENT

Not applicable.

BACKGROUND OF THE INVENTION

This invention relates to tables and chairs used in medical settings. Medical examination and treatment tables and chairs tend to be relatively heavy and thus can be difficult to move once in place in an exam room or office. It is often necessary, however, to clean around and under such tables and chairs, especially, for example, after a biohazard spill. Many tables or chairs have stationary bases, which are inexpensive but require special lifting and/or moving equipment since they are generally too heavy to lift or even slide manually. One approach for improving mobility has been to include swiveling and locking caster wheels on each corner of the base of the table or chair. However, such designs tend to be expensive, and the larger bases required to accommodate caster wheels on each corner of the base can create tripping hazards for patients and medical care providers. Another option, as described in published application EP 0366365 A2 entitled, "Improvements in surgical and/or examination tables" by Spruill et al., is to include four retractable caster wheels on the base of the table. However, having all the caster wheels be retractable increases the cost and complexity of the table.

Therefore, there is a need for medical examination tables and chairs that can be safely and easily switched between stationary and mobile states and that can be produced relatively simply and inexpensively.

BRIEF SUMMARY OF THE INVENTION

It is an object of the present invention to provide an examination, procedure, or surgical table or chair for use in the medical, dental, or veterinary fields that can be quickly, safely and easily switched between a stationary state and a mobile state wherein the table or chair includes a base plate with fixed wheels on one end and on the other end stationary foot pads and retractable wheels that can be engaged by a lift mechanism that can transfer the weight of the table or chair from the foot pads onto the wheels.

It is a further object of the invention that the lift mechanism for forcing the wheels downward and thereby lifting the table or chair off the foot pads on one end of the medical examination table or chair and onto the wheels on that end be a mechanical, hydraulic, or electrical actuator.

It is a further object of the invention that a mechanical lift mechanism have an over-center configuration such that the wheels will be locked in the engaged position.

DETAILED DESCRIPTION OF THE INVENTION

Figure 1:
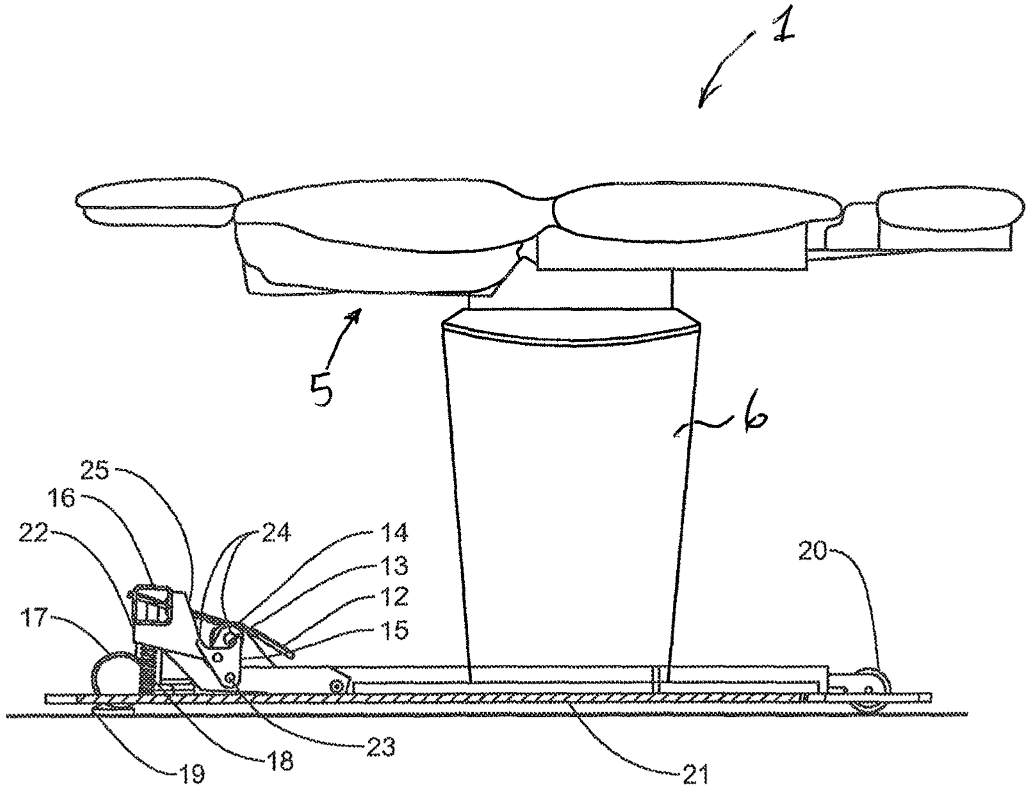
FIG. 1 is a side view of an examination table of the present invention with rear caster wheels retracted.
Figure 3:
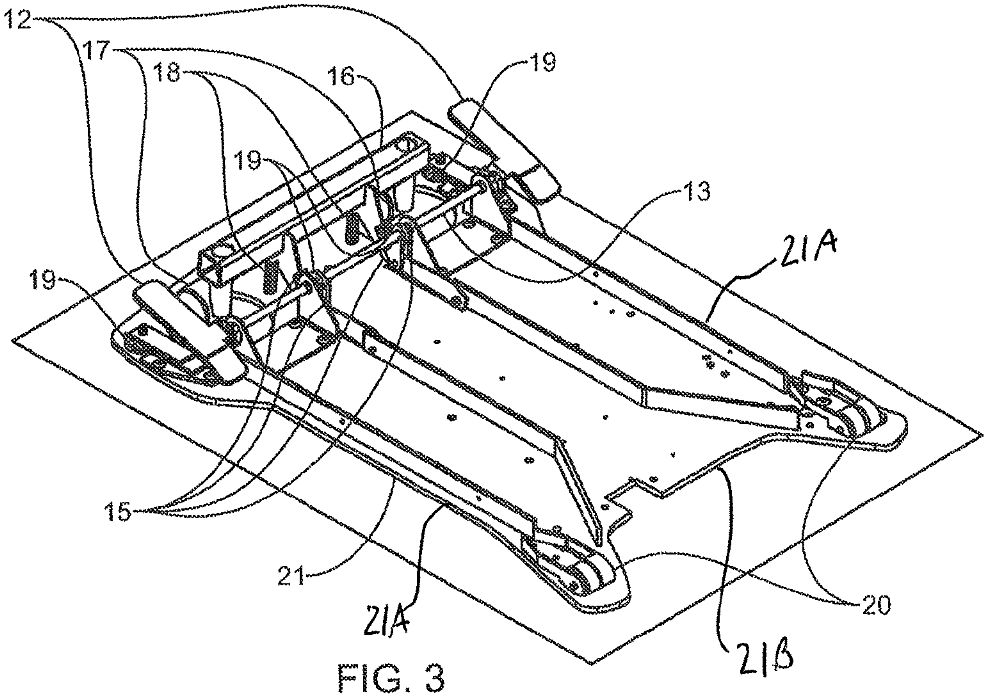
FIG. 3 is a perspective view of a base of the present invention.

Referring to FIG. 1, a medical examination table 1, or unit, having a patient support 5 is shown that includes a column support 6 on a base plate 21 in which rear caster wheels 17 are retracted and not bearing the weight of the base plate 21. With the rear caster wheels 17 retracted, the unit is in a stationary state and the base plate 21 rests on foot pads in the rear and wheels in the front. The foot pads may be any suitable material, including hard rubber or plastic or may be an extension of the base plate. In FIG. 1 the base plate 21 is shown resting on two rear leveling feet 19 and two front wheels 20, which can be any suitable wheels for a medical examination table or chair, including swiveling caster wheels, for example. Preferably, however, the front wheels 20 are low-profile fixed wheels, which can be less expensive compared to swiveling caster wheels and can have smaller profiles around the base plate 21 as well. As shown in FIG. 3, base plate 21 is also provided with a relieved perimeter having side inset sections 21A and front inset section 21B. This, in combination with the retractable rear caster wheels, enables the table to have a base footprint with a smaller size, which helps to minimize the tripping hazard for patients and medical care providers compared to a table having locked, swiveling, non-retracting caster wheels on both ends, although such an arrangement may be suitable in some circumstances. The rear caster wheels 17 of the present invention also can reduce the cost of production because the rear caster wheels 17 do not have to be locking wheels since when the rear caster wheels 17 are retracted the table settles onto stationary pads, such as the rear leveling feet 19 as shown, which help prevent the table from moving inadvertently while in the stationary position. To reduce the chance of sideways motion while the unit is in the stationary position, the front wheels 20 are preferably non-swiveling and oriented to roll only forward or backward. Further, the rear stationary feet are preferably leveling feet but can be any suitable stationary foot pads. Preferably, the foot pad or pads are of a size such that when the base plate 21 rests on the rear feet and the front wheels, the base plate 21 will be approximately level, or can be adjusted to be so with the use of leveling feet.

Figure 2:
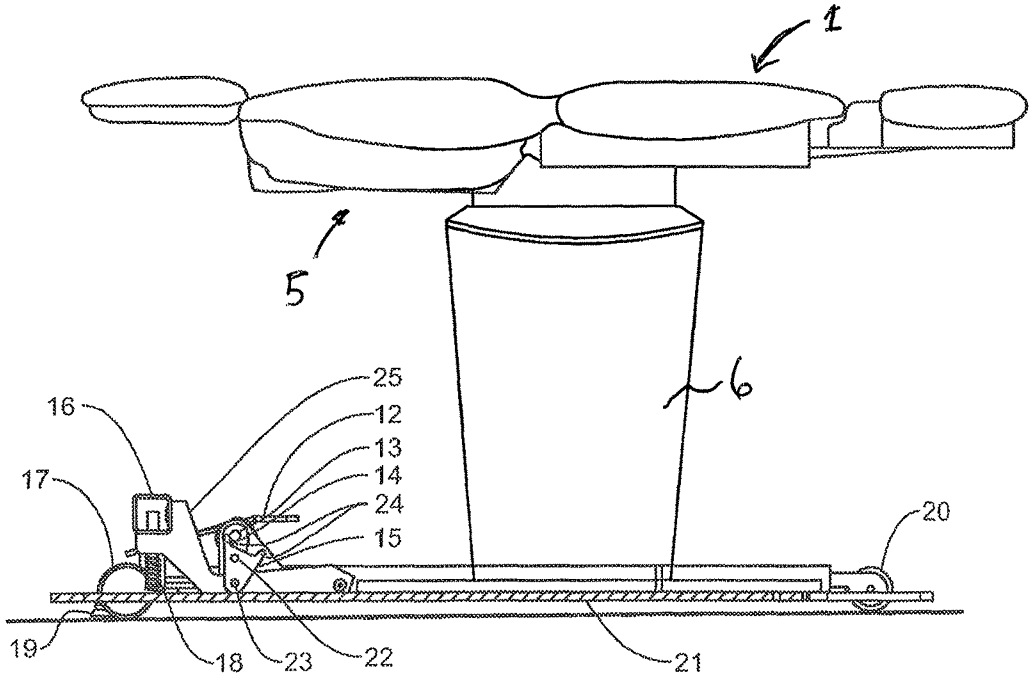
FIG. 2 is a side view of an examination table of the present invention with rear caster wheels engaged.
Figure 6:
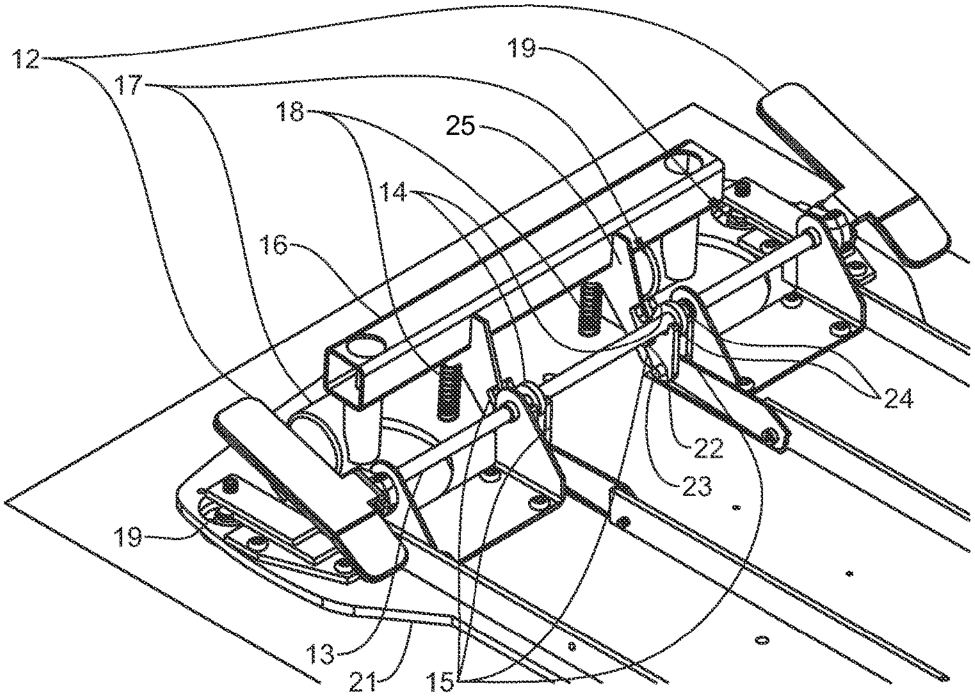
FIG. 6 is a perspective view of a lift mechanism of the present invention when the caster wheels are retracted.
Figure 7:
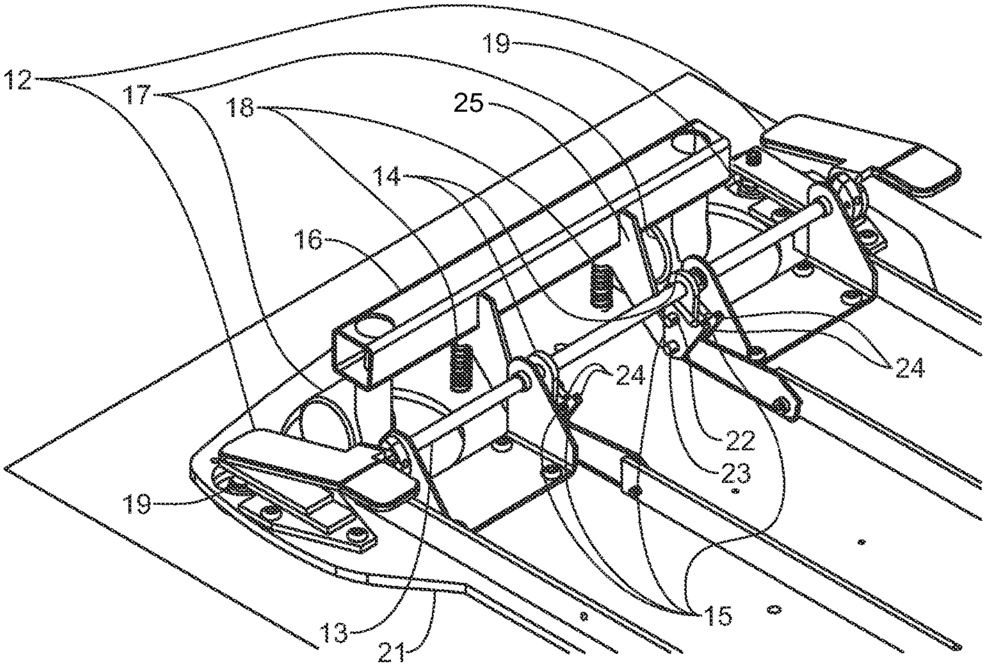
FIG. 7 is a perspective view of a lift mechanism of the present invention when the caster wheels are engaged.

Referring to FIG. 2, the unit is now shown in a mobile state where the rear caster wheels 17 are engaged on the ground or floor beneath the base plate 21. In this position, the unit can be conveniently moved to another location in order to allow for cleaning of spills, for example. When unit is in the mobile position, the rear leveling feet 19 are off the ground and no longer bearing the weight of base plate 21. The rear caster wheels 17 can be engaged, and disengaged, using any suitable switch mechanism, such as a button, a hand lever, touch screen, or pedal 12. As shown, the pedal 12 is a foot pedal located near the rear of the unit. A second pedal 12 could be included on the opposite side of the unit for convenience, as can be seen in FIGS. 3, 6 and 7.

By raising only the half of the unit (the front half always rests on the front wheels 20), the force required to put the unit into a mobile mode with the rear caster wheels 17 engaged is roughly half the amount of force that required if wheels in the front had to be engaged as well. Because the units generally need only be moved within a room, such as for cleaning purposes, when in the mobile state, the clearance between the bottom of the base and the floor can be quite limited, for example about one-quarter inch. This allows the non-retractable wheels 20 to be inconspicuous and further minimizes the distance the unit must be lifted in order to engage the rear caster wheels 17.

While this design requires only half the table to be lifted to engage the rear wheels, the forces required to engage the rear caster wheels 17 may still be substantial. Therefore, a suitable lift mechanism is provided to engage and retract the rear caster wheels 17. The lift mechanism may be coupled between the base plate 21 and a caster arm 16, for example, to which the rear caster wheels 17 can be attached. The lift mechanism can include a linkage system that includes one or more actuators that can directly or indirectly force the caster arm 16 downward a sufficient distance and with sufficient force to place the rear caster wheels 17 onto the ground or floor such that the weight of the unit transfers to rear caster wheels 17 and off of leveling feet 19.

According to an exemplary embodiment, the lift mechanism may be a mechanical linkage arrangement, as shown in FIGS. 3-7. The mechanical advantage generated by this linkage arrangement allows a typical user to easily engage and retract the rear caster wheels 17 by pressing on pedal 12 with his or her foot. The over-center alignment of the linkage arrangement when the rear caster wheels 17 are engaged also provides a safety feature in that this configuration allows the lift mechanism to be self-locking. Additional weight applied to the table (such as if a person were to lean or sit on the table) would not cause the linkage arrangement to disengage and drop to the retracted position.

Figure 4:
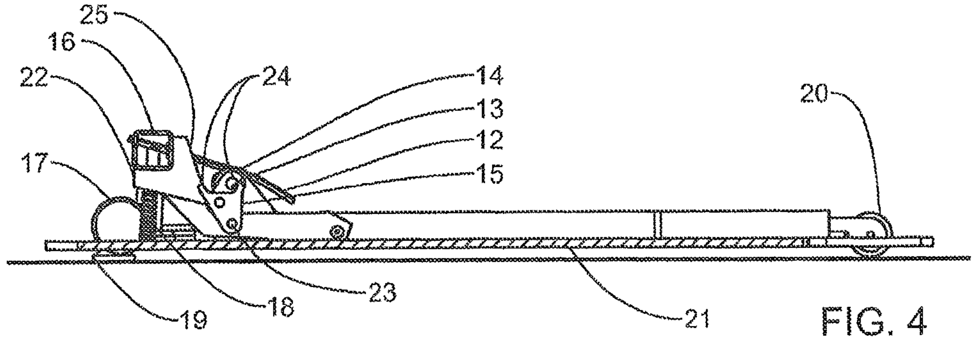
FIG. 4 is a side view of a lift mechanism with rear caster wheels retracted.

In the stationary state, the rear caster wheels 17 are retracted and the base plate 21 is supported by the rear leveling feet 19 and the front wheels 20. To move the unit, a user would engage the rear caster wheels 17 by pressing down on a portion of the pedal 12 (as shown in FIG. 3 the portion of pedal 12 to be pressed downward to reach the engaged position is the rearward portion of pedal 12). Referring now to FIGS. 3-7, which depict an exemplary mechanical linkage lift mechanism, in a preferred embodiment pressing down on the rearward portion of the pedal 12 causes a shaft 13 to rotate (counterclockwise as shown in FIGS. 3 and 4), which in turn cause cranks 14 to also rotate (counterclockwise from the retracted position shown in FIGS. 4 and 6 to the engaged position shown FIGS. 5 and 7). The cranks 14 would then force links 15 to shift toward an engaged position (a forward movement as depicted), which would cause caster arm brackets 25 to rotate about link-arm pivot pins 23 that connect the links 15 and the caster arm brackets 25 (as can be seen from FIG. 4 to FIG. 5 and from FIG. 6 to FIG. 7). The resulting motion of the caster arm brackets 25 thus forces caster arm 16, which is connected to the caster arm brackets 25, downward. The rear caster wheels 17 are attached to the bottom of the caster arm 16 and so the downward motion of the caster arm 16 presses the rear caster wheels 17 into the floor, thereby raising the base plate 21 off of the leveling feet 19 and transitioning the weight of the unit onto the rear caster wheels 17. In this position, the unit can be rolled to a new location. Preferably, the rear caster wheels 17 are swiveling so that the unit can be easily rolled in any direction even if the front wheels 20 are non-swiveling.

Figure 5:
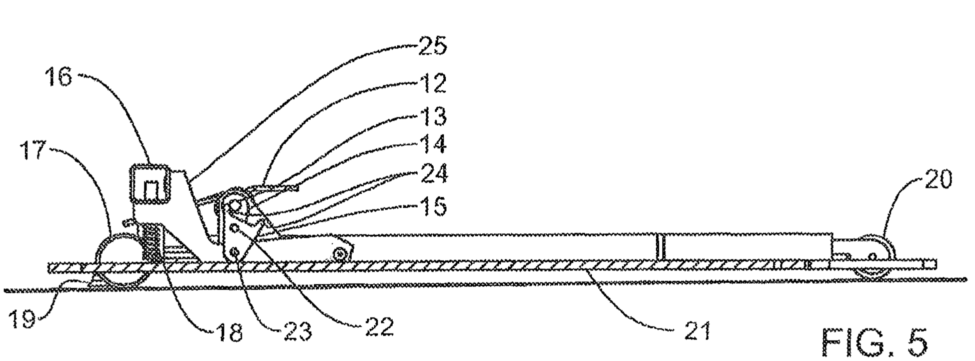
FIG. 5 is a side view of a lift mechanism with rear caster wheels engaged.

Preferably the mechanical linkage lift mechanism includes an over-center configuration so that no catch or locking mechanism is needed to keep the rear caster wheels 17 in the engaged setting. As can be seen in FIGS. 4 and 5, the linkage mechanism can maintain the engaged setting through the alignment of the cranks 14 and the links 15 in the engaged position, which can be such that crank-link pivot pins 22 that link the cranks 14 and the links 15 will be just slightly forward of a pivot axis (which in FIG. 5 can be visualized as a vertical line between the end of the shaft 13 and the link-arm pivot pin 23). The resulting over-center geometry creates a self-locking mechanism in the engaged setting since the weight of the unit will tend to provide a force that acts to prevent the shaft 13, links 15 and cranks 14 from moving out of the engaged position.

To disengage the rear caster wheels 17 using the mechanical linkage lift mechanism and place the unit back into a stationary mode, the user would press on an opposite portion of the pedal 12 (that is, opposite from the portion pressed to engaged the rear caster wheels 17, which is a forward portion of the pedal 12 as shown) while the pedal 12 is in the engaged position, as can be seen in FIGS. 5 and 7, for example. Pressing on the opposite portion of the pedal 12 while the pedal 12 is in the engaged position causes the cranks 14 and links 15 to move away from the over-center position and so the weight of the unit would then force the links 15 toward the retracted position (a rearward motion as shown from FIG. 5 to FIG. 4, for example), which would cause the caster bracket arms 25 to pivot in a manner to pull caster arm 16 upward, resulting in the rear caster wheels 17 being lifted upwards and allowing the base plate 21 to rest on the leveling feet 19 in a stationary setting. Springs 18 could further retract the caster arm 16 so that the rear caster wheels 17 would lift fully off the ground or floor (as shown for example in FIG. 4) when the unit is in the stationary mode. In this manner, the present invention allows medical examination tables and chairs to be compliant with Americans with Disabilities Act (ADA) low entry requirements in a stationary state and also to be easily relocated when in the mobile state.

In addition, stops 24 could be built into the links 15 that would engage the shaft 13 in order to provide limits to the motion of the linkage assembly in both the retracted and engaged positions, as can be seen in FIG. 4, in which the shaft 13 is against stops 24 located on a forward portion of the links 15 when the rear caster wheels 17 are in the retracted position and in FIG. 5, in which the shaft 13 is against stops 24 located on a rearward portion of the links 15 when the rear caster wheels 17 are in the engaged position.

Figure 8:
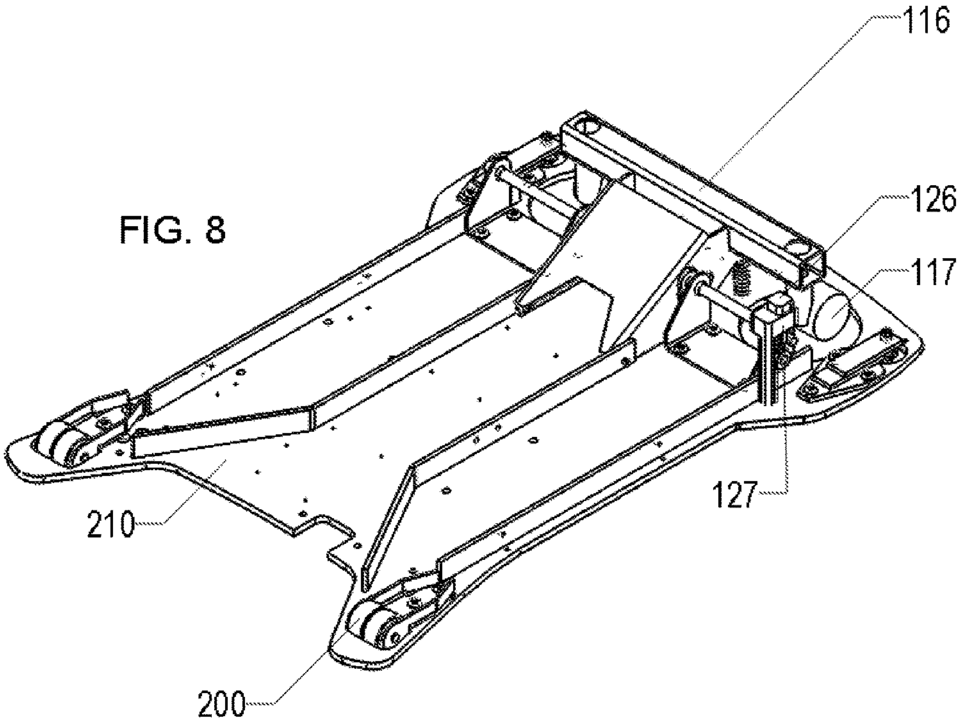
FIG. 8 is a perspective view of an embodiment of a base of the present invention.
Figure 9:
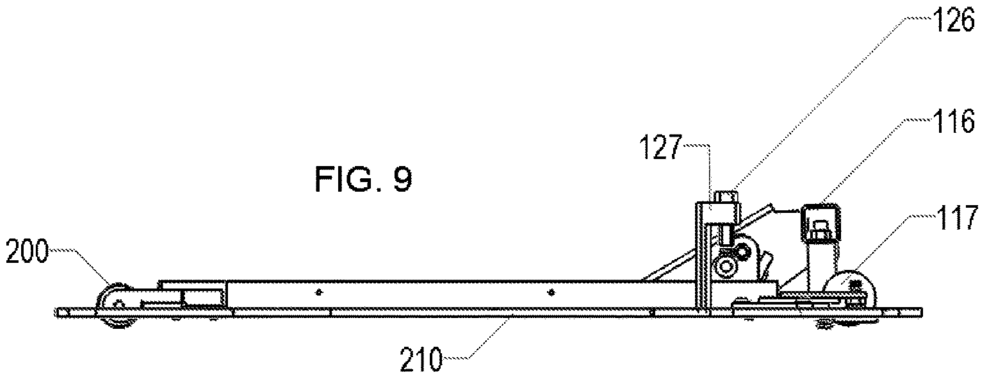
FIG. 9 is a side view of a base of an embodiment of a base of the present invention.

Alternatively, the lift mechanism may be powered by an electric actuator, for example by coupling an electric actuator to a linkage lift mechanism so that the lift mechanism is electrically powered and controlled. As depicted in FIGS. 8 and 9, for example, which shows a base plate 210 with fixed wheel 200, an electric actuator 126 is connected to a linkage mechanism in order to rotate a shaft that results in a caster arm 116 being driven downward and caster wheels 117 engaging the ground. To disengage the caster wheels 117, the actuator 126 would cause the shaft to rotate in the opposite direction, causing the caster arm 116 to raise and lift the caster wheels 117 off the ground. The actuator 126 can be anchored to base plate 210 via bracket 127 or any suitable anchoring arrangement.

Figure 10:
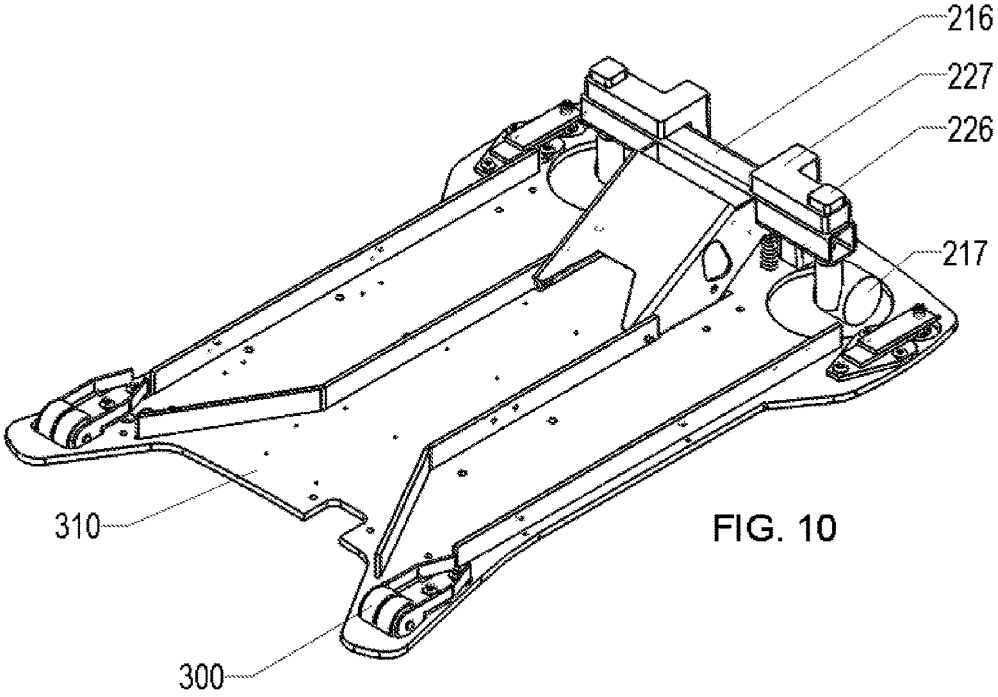
FIG. 10 is a perspective view of another embodiment of a base of the present invention.
Figure 11:
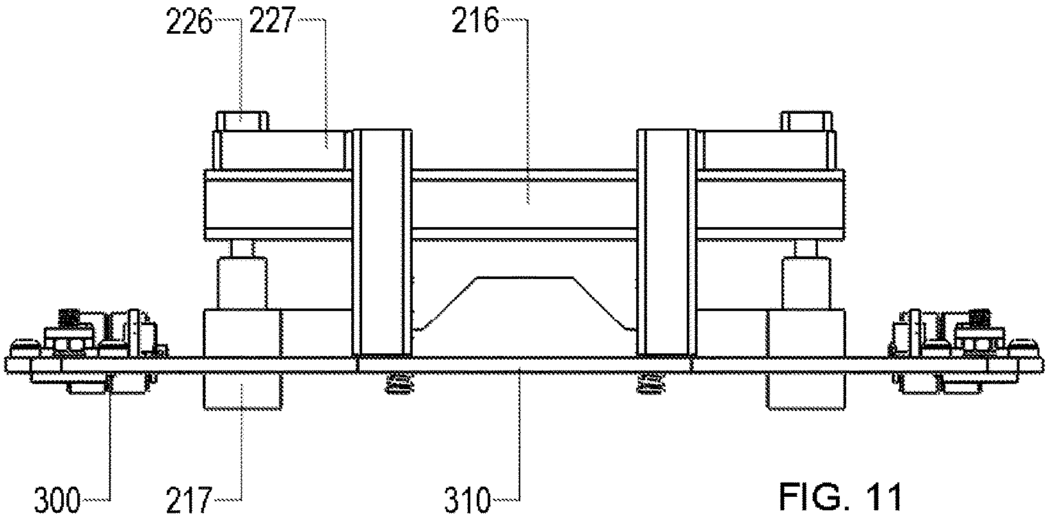
FIG. 11 is an end view of another embodiment of a base of the present invention.

In addition, other suitable lift mechanisms could include hydraulic actuators, pneumatic actuators, and electric actuators that can be arranged to engage and retract the retractable wheels. For example, as shown in FIGS. 10 and 11, an electric actuator 226 is coupled to base plate 310 using bracket 227 and may be positioned such that when the actuator 226 is in the extended position, the caster arm 216 is forced downward and caster wheels 217 are moved into the engaged position and bear the weight of base plate 310 (along with fixed wheel 300). When the actuator 226 is in the retracted position, the caster arm 216 will be raised, thus raising the caster wheels 217 off the ground and returning the weight of base plate 310 to foot pads. In this arrangement, the actuator 226 may be a push-only actuator that relies on gravity to move or return the actuator 226 to the retracted position. Other configurations of actuator/wheels may be appropriate depending on the type of table or chair.

The above description could apply to a unit that has other equipment attached to the base plate instead of a medical examination table, such as a medical chair, dental chair, veterinary table, utility cart or other units or furniture for which it would be desirable to toggle quickly, easily and safely between mobile and stationary states. In addition, while the above description refers to rear and front aspects of the units, such distinctions are used for convenience of description and could be reversed without deviating from the present invention.

The invention claimed is:

1. A medical examination table assembly comprising:

a base having a perimeter including front, back and side sections;

a column support mounted on said base within said perimeter, dividing said base into front and rear portions defined by said perimeter;

a patient support mounted on said column support configured to be at least at an ADA compliant low entry position in a stationary state;

a plurality of fixed wheels capable of supporting said base on a ground surface, mounted within said front portion of said base and facilitating movement of said medical examination table;

a plurality of leveling feet capable of supporting said base on said ground surface, mounted within said rear portion of said base;

a plurality of caster wheels capable of intermittently supporting said base on said ground surface, mounted within said rear portion of said base and facilitating multidirectional movement of said medical examination table;

a lift mechanism mounted on said base within said rear portion of said base, said lift mechanism affixed to each of said caster wheels and intermittently operable to alternately place said medical examination table in: (i) the stationary state in which said plurality of fixed wheels and said plurality of leveling feet are in contact with said ground surface and said caster wheels are spaced apart from said ground surface, and (ii) a mobile state in which said plurality of fixed wheels and said plurality of caster wheels are in contact with said ground surface and said plurality of leveling feet are spaced apart from said ground surface; and an actuator, affixed to said lift mechanism, for selecting said stationary state and said mobile state of said medical examination table.

2. The medical examination table of claim 1, wherein at least one of said side and front sections of said base perimeter have a curved relief forming a perimeter inset.

3. The medical examination table of claim 1, wherein said actuator is within the perimeter of said base.

4. The medical examination table of claim 1, wherein said patient support is sectional.

5. The medical examination table of claim 1, wherein said actuator selects between said stationary state and said mobile state with a single motion.

6. The medical examination table of claim 1, wherein said actuator is a pedal for engagement with the foot of a user.

7. The medical examination table of claim 1, wherein said lift mechanism is locked into said stationary state by said actuator.

8. The medical examination table of claim 1, wherein said lift mechanism further comprises said actuator mechanically affixed to each of said caster wheels and displacement of said actuator causes said lift mechanism to raise each of said caster wheels into a spaced apart position from said ground surface when said medical examination table is placed in said stationary state.

9. The medical examination table of claim 8, wherein said caster wheels are simultaneously raised by said displacement of said actuator.

10. The medical examination table of claim 9, wherein said displacement of said actuator further comprises a single motion.

11. The medical examination table of claim 1, wherein said actuator is a pivoting pedal.

12. The medical examination table of claim 11, wherein said pivoting pedal places said medical examination table in said stationary state when pivoted in a first direction and in said mobile state when pivoted in a second direction.

13. The medical examination table of claim 1, wherein said plurality of fixed wheels permit only forward and backward movement of said medical examination table with respect to said ground surface.

14. The medical examination table of claim 1, wherein said mobile state permits said medical examination table to be moved multidirectionally with respect to said ground surface.

* * * * *